No. 837,485. PATENTED DEC. 4, 1906.
J. MACKEY.
STEAM COOKER.
APPLICATION FILED OCT. 4, 1902. RENEWED MAY 10, 1906.
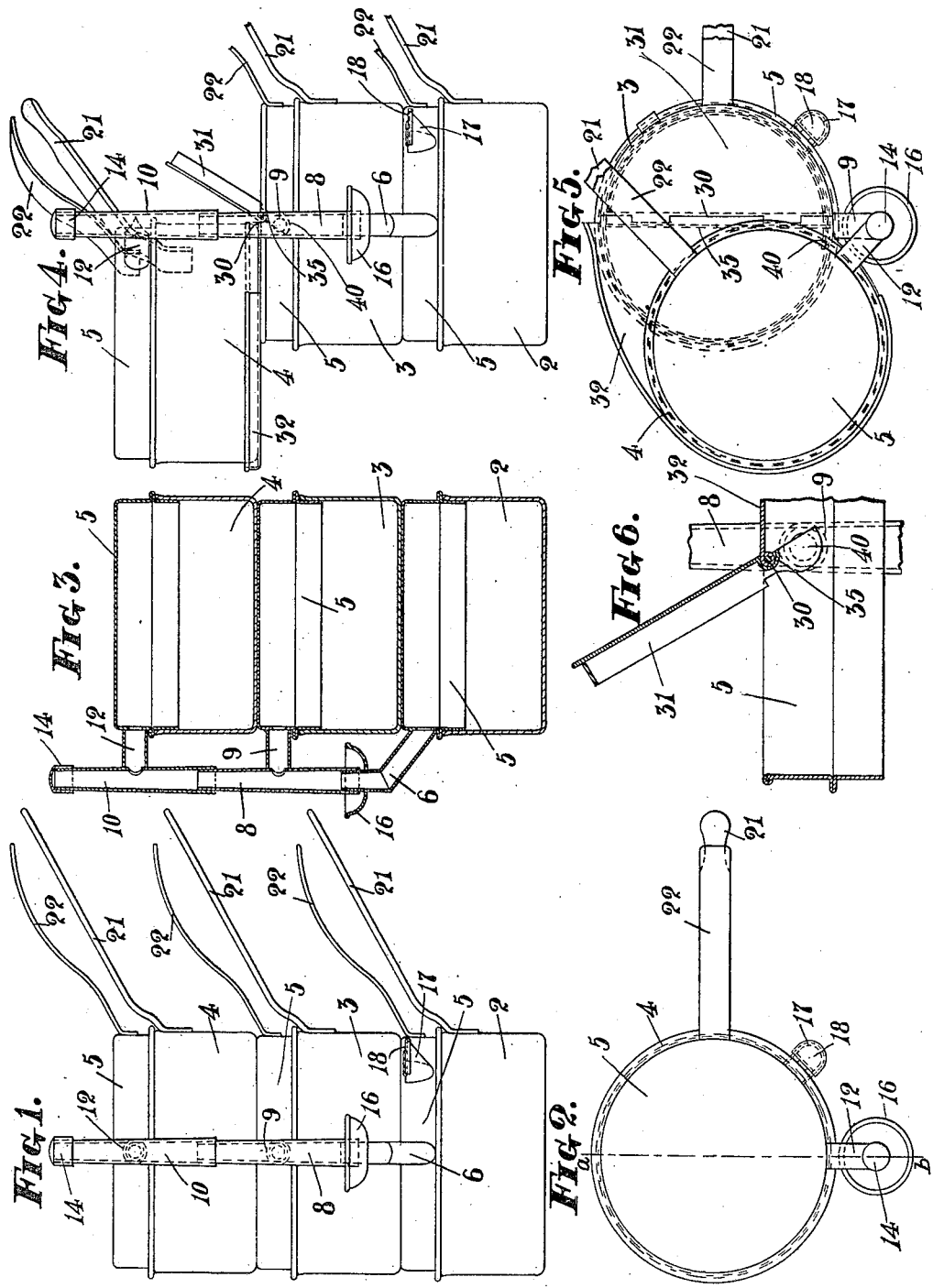
WITNESSES
INVENTOR
James Mackey
By Richardson
ATTORNEYS

UNITED STATES PATENT OFFICE.

JAMES MACKEY, OF BRADFORD, ENGLAND.

STEAM-COOKER.

No. 837,485.     Specification of Letters Patent.     Patented Dec. 4, 1906.

Application filed October 4, 1902. Renewed May 10, 1906. Serial No. 316,163.

*To all whom it may concern:*

Be it known that I, JAMES MACKEY, a subject of the King of England, residing at 369 Harewood street, Bradford, England, have invented certain Improvements in Steam-Cookers particularly applicable for domestic purposes, also applicable for distilling water, of which the following is a specification.

This invention relates to improvements in steam-cookers particularly applicable for domestic use; and its object is to enable a number of pans to be connected to a steam-producing pan and enable a number of comestibles to be cooked at the same time and receive steam from the same source, also applicable for distilling water.

Figure 1 is an elevation of my improved cooker. Fig. 2 is a plan view of the same. Fig. 3 is a vertical section on the broken line $a\, b$, Fig. 2. Fig. 4 is an elevation showing an additional improvement particularly applicable for large pans. Fig. 5 is a plan view of the same. Fig. 6 is a section of part of one of the lids on a larger scale.

The pans 2, 3, and 4 are of any ordinary form and are each fitted with a lid 5, having a flat top, so that the pans can be mounted one above the other, as shown. The lid of the bottom pan is provided with a steam-passage 6 in the side, and the top of this passage is connected to the bottom of the vertical pipe 8, having a branch 9, connected to the lid 5 of the next pan and opening in the latter. The upper end of the pipe 8 is connected to a similar pipe 10 and branch 12 connected to the lid of the next pan. Other pans may be mounted on the top of this and coupled up in a similar way, the top of the vertical pipe being finally closed by a cap 14.

It will be understood if the bottom pan is filled with water and heat applied that when the water boils steam will pass up the vertical pipe and from thence by the branch passages in the lids into each of the pans and if continued the required time will cook their contents.

A cup 16 is secured round the top of the passage 6 to collect any condensed water running down the vertical pipes. A branch opening 17, closed by a hinged lid 18, is preferably provided, so that the water in the bottom pan can be replenished without removing the lid and pans above. The pans are provided with handles 21 and the lids with handles 22.

In Figs. 4, 5, and 6 the lids 5 of all the pans above the bottom one are made with a hinge 30 across the middle, so that the piece 31 can be lifted up, as shown in Figs. 4 and 6, to give access to the contents of the pan. The lids in this case are made with platform-pieces 32 to support the pan or pans above when they are turned aside to enable the piece 31 to be raised without actually lifting off the pan or pans above. The lid-piece 31 has a strip 35 all along its hinged edge. This strip is curved in cross-section, as shown in Fig. 6, and incloses the hinges when the lid 31 is closed, thereby helping to make the joint steam-tight.

A projection 40 is also provided on the lid-piece 31, adapted to cover the end of the branch pipe 9 when the lid is open, as clearly shown in Fig. 6, and stop the passage of steam.

I claim—

1. The combination with a pan having a flat lid adapted to support an upper pan thereon of couplings adapted to connect the lids of the pans the lid of the lower pan being provided with a platform or extension 32, substantially as herein shown and described and for the purpose specified.

2. The combination with a pan having a flat lid hinged intermediate of its width, a second pan above the first-named pan having lateral movement in relation to the hinged lid of said first-named pan, said pans being connected together by couplings, substantially as described.

3. The combination with a pan having a flat lid adapted to support an upper pan thereon of couplings adapted to connect the lids of the pans the lid of one of said pans being provided with a lid-piece 31 and a projection 40 substantially as herein shown and described and for the purpose specified.

In witness whereof I have hereunto set my hand in presence of two witnesses.

JAMES MACKEY.

Witnesses:
    CECIL A. S. BAXTER,
    DAVID NOWELL.